(12) United States Patent  
Silverbrook

(10) Patent No.: US 7,591,553 B2  
(45) Date of Patent: *Sep. 22, 2009

(54) PERSONAL DIGITAL ASSISTANT WITH INTERNAL PRINTER HAVING CAPPING MECHANISM

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 823 days.

This patent is subject to a terminal disclaimer.

(21) Appl. No.: 10/920,283

(22) Filed: Aug. 18, 2004

(65) Prior Publication Data

US 2005/0052479 A1 Mar. 10, 2005

Related U.S. Application Data

(63) Continuation of application No. 10/040,472, filed on Jan. 9, 2002, now Pat. No. 6,942,334.

(30) Foreign Application Priority Data

Jan. 17, 2001 (AU) .................................. PR2564

(51) Int. Cl.  
*B41J 3/36* (2006.01)

(52) U.S. Cl. .................... 347/109; 400/88; 400/634

(58) Field of Classification Search ............. 347/109; 400/88, 634

See application file for complete search history.

(56) References Cited

U.S. PATENT DOCUMENTS

| | | |
|---|---|---|
| 4,372,694 A | 2/1983 | Bovio et al. |
| 4,436,439 A | 3/1984 | Koto |
| 5,047,615 A | 9/1991 | Fukumoto et al. |
| 5,456,540 A * | 10/1995 | Jeutter .................. 400/634 |
| 5,559,932 A | 9/1996 | Machida et al. |
| 5,815,179 A | 9/1998 | Silverbrook |
| 5,897,602 A | 4/1999 | Mizuta |
| 5,966,285 A | 10/1999 | Sellers |
| 6,087,638 A | 7/2000 | Silverbrook |
| 6,095,410 A | 8/2000 | Anderson et al. |
| 6,158,907 A | 12/2000 | Silverbrook et al. |
| 6,219,227 B1 | 4/2001 | Trane |
| 6,270,182 B1 * | 8/2001 | Silverbrook et al. .......... 347/29 |
| 6,270,271 B1 | 8/2001 | Fujiwara |
| 6,940,490 B1 | 9/2005 | Kim et al. |
| 7,056,040 B2 * | 6/2006 | Silverbrook et al. .......... 400/88 |
| 2004/0066447 A1 | 4/2004 | Arnold |

FOREIGN PATENT DOCUMENTS

| | | |
|---|---|---|
| DE | 4434277 A1 | 4/1995 |
| GB | 2087800 A | 6/1982 |
| JP | 02-145423 | 12/1990 |
| JP | 04-355176 | 12/1992 |
| JP | 05-270081 A | 10/1993 |
| JP | 06-301649 | 10/1994 |

(Continued)

*Primary Examiner*—Stephen D Meier  
*Assistant Examiner*—Ly T Tran

(57) ABSTRACT

A hand held personal digital assistant including:
- an information storage device;
- a display;
- a printer including a pagewidth printhead wherein said printhead is an inkjet printhead;
- a capping mechanism for capping the printhead when not in use; and
- a user interface allowing a user to: selectively retrieve and display information from said storage device on said display; print said information using said printer; and enter and store new information in said information storage device.

6 Claims, 12 Drawing Sheets

FOREIGN PATENT DOCUMENTS

| | | |
|---|---|---|
| JP | 06-314137 | 11/1994 |
| JP | 08-022343 | 1/1996 |
| JP | 11138911 | 5/1999 |
| JP | 11-266107 | 9/1999 |
| JP | 11-301859 A | 11/1999 |
| JP | 11-311526 A | 11/1999 |
| JP | 2000-025304 A | 1/2000 |
| JP | 2001-328309 A | 11/2001 |

* cited by examiner

PERSONAL DIGITAL ASSISTANT WITH INTERNAL PRINTER HAVING CAPPING MECHANISM

CROSS REFERENCES TO RELATED APPLICATIONS

The present application is a Continuation of U.S. application Ser. No. 10/040,472 filed on Jan. 9, 2002, now issued U.S. Pat. No. 6,942,334.

BACKGROUND OF THE INVENTION

The following invention relates to a hand-held computing device, of the type commonly referred to as a personal digital assistant, with an internal printer. More particularly, though not exclusively, the invention relates to a personal digital assistant having a pagewidth drop-on-demand printhead and a source of print media located in the personal digital assistant.

A personal digital assistant, such as the type commonly known under the trade mark Palm Pilot, is typically a hand-held portable electronic device having a fold down display screen and a control panel. The display screen is typically of a touch screen type that reacts to touches made by a user controlling a pixel pen. Alternatively user inputs are provided to the digital assistant through a keypad or in-built curser ball.

Personal digital assistants provide a user with the convenience to be able to store diaries, address books, meeting schedules etc in a compact, transportable form as well as to be able to instantly add new entries such as meeting notes, new addresses etc.

Much of the benefit of such portable prior art personal digital assistants is lost however if a print-out of any stored information is required. To print information, prior art digital assistants must be connected to a print device compatible with the digital assistant which requires additional cabling to be carried thus reducing the portability of the digital assistant. Alternatively the digital storage medium that stores the images within the digital assistant must be transferred to another computer having compatible software for reading the storage medium and which is connected to a printer. Each of the above alternatives can only be implemented if these other computing devices are readily at hand. The prior art personal digital assistants are thus yet to reach their maximum potential as a functional medium for storing and transporting information. With the advent of mobile communications technologies potentially allowing electronic commerce to be conducted through one's digital assistant, it is becoming essential that digital assistants have more suitable print capabilities for printing hard copies of the information stored in the digital assistant.

However, presently, printer technology has not been suitable for incorporating into personal digital assistants without a significant compromise in the size and portability of such devices.

OBJECTS OF THE INVENTION

It is an object of the present invention to overcome or substantially ameliorate at least one of the above disadvantages.

It is another object of the present invention to provide a personal digital assistant having an in-built printer.

It is a further object of the invention to provide a personal digital assistant having an in-built printer without significantly increasing the size over prior art digital assistants.

It is a further object of the present invention to provide a personal digital assistant from which stored information can be printed without connecting the digital assistant to additional computing or printing devices.

DISCLOSURE OF THE INVENTION

There is disclosed herein a hand held personal digital assistant including information storage means, display means, in-built printer means, control means allowing a user to selectively retrieve and display information from said storage means on said display means and to print said information using said printer means and means allowing a user to enter and store new information in said information storage means.

Preferably the personal digital assistant includes a body section connected to said display means through a hinge joint, said body section housing said information storage means and said control means, wherein at least a portion of said printer means is disposed in said hinge joint.

Preferably the printer means includes a supply of print media located within said personal digital assistant.

Preferably said supply of print media is located substantially within said hinge.

Preferably a printhead of the printer is a monolithic pagewidth printhead.

Preferably the printhead is an ink jet printhead.

Preferably the body or hinge includes a releasable cover portion through which a portion of the printer including the print media and/or an ink cartridge can be removed.

BRIEF DESCRIPTION OF THE DRAWINGS

The invention will now be described by way of example with reference to the accompanying diagrammatic drawings in which.

DESCRIPTION OF THE PREFERRED EMBODIMENT

Figure 1:
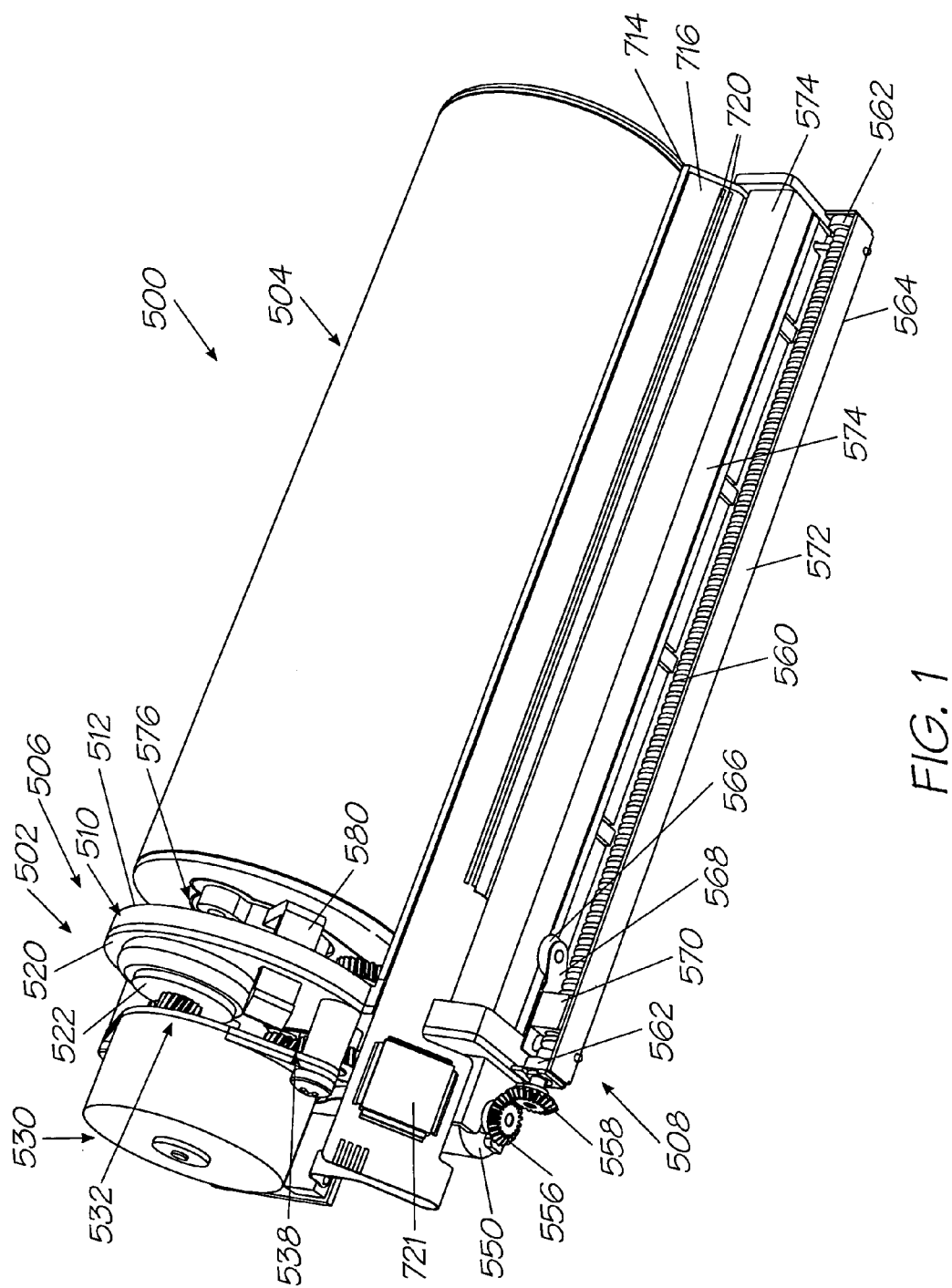
FIG. 1 shows a three dimensional view of a print engine, including components in accordance with the invention.
Figure 2:
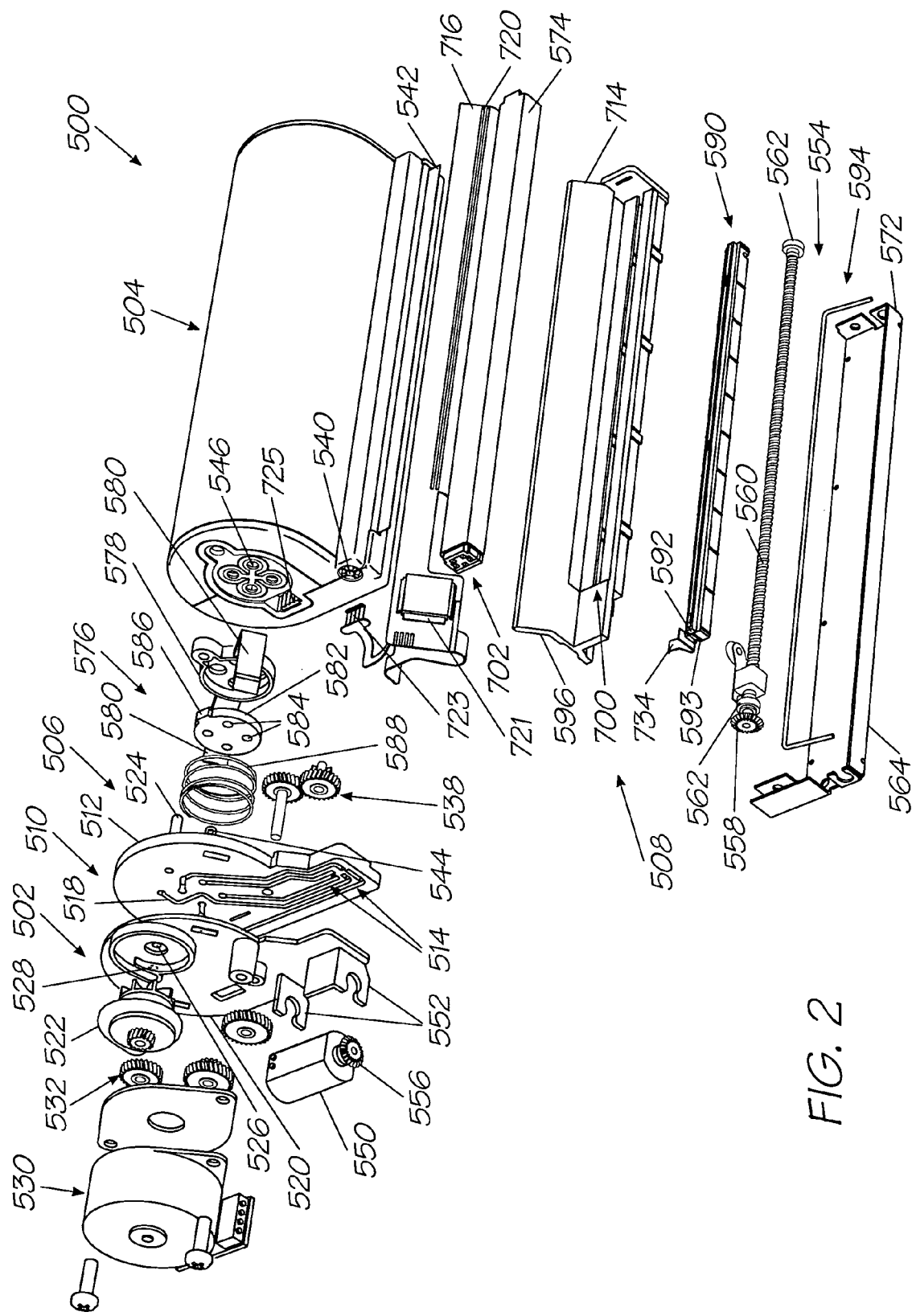
FIG. 2 shows a three dimensional, exploded view of the print engine.

In FIGS. 1 to 10 of the accompanying drawings, reference numeral 500 generally designates a print engine, in accordance with the invention. The print engine 500 includes a print engine assembly 502 on which a print roll cartridge 504 is removably mountable.

The print cartridge 504 is described in greater detail in our co-pending applications U.S. Ser. Nos. 09/607993 and 09/607,251, the contents of that disclosure being specifically incorporated herein by reference.

The print engine assembly 502 comprises a first sub-assembly 506 and a second, printhead sub-assembly 508.

The sub-assembly 506 includes a chassis 510. The chassis 510 comprises a first molding 512 in which ink supply channels 514 are molded. The ink supply channels 514 supply inks from the print cartridge 504 to a printhead 516 (FIGS. 5 to 7) of the printhead sub-assembly 508. The printhead 516 prints in four colors or three colors plus ink which is visible in the infra-red light spectrum only (hereinafter referred to as 'infra-red ink'). Accordingly, four ink supply channels 514 are defined in the molding 512 together with an air supply channel 518. The air supply channel 518 supplies air to the printhead 516 to inhibit the build up of foreign particles on a nozzle guard of the printhead 516.

The chassis 510 further includes a cover molding 520. The cover molding 520 supports a pump 522 thereon. The pump 522 is a suction pump, which draws air through an air filter in the print cartridge 504 via an air inlet pin 524 and an air inlet opening 526. Air is expelled through an outlet opening 528 into the air supply channel 518 of the chassis 510.

The chassis 510 further supports a first drive motor in the form of a stepper motor 530. The stepper motor 530 drives the pump 522 via a first gear train 532. The stepper motor 530 is also connected to a drive roller 534 (FIG. 5) of a roller assembly 536 of the print cartridge 504 via a second gear train 538. The gear train 538 engages an engageable element 540 (FIG. 2) carried at an end of the drive roller 534. The stepper motor 530 thus controls the feed of print media 542 to the printhead 516 of the sub-assembly 508 to enable an image to be printed on the print media 542 as it passes beneath the printhead 516. It also to be noted that, as the stepper motor 530 is only operated to advance the print media 542, the pump 522 is only operational to blow air over the printhead 516 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 5) in the print cartridge 504 to be supplied to the printhead 516.

A second motor 550, which is a DC motor, is supported on the cover molding 520 of the chassis 510 via clips 552. The motor 550 is provided to drive a separating means in the form of a cutter arm assembly 554 to part a piece of the print media 542, after an image has been printed thereon, from a remainder of the print media. The motor 550 carries a beveled gear 556 on an output shaft thereof. The beveled gear 556 meshes with a beveled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 516. In addition, the insert 584 defines a land or platform 586 which closes off an inlet opening of the air inlet pin 524 for the same purposes.

Figure 3:
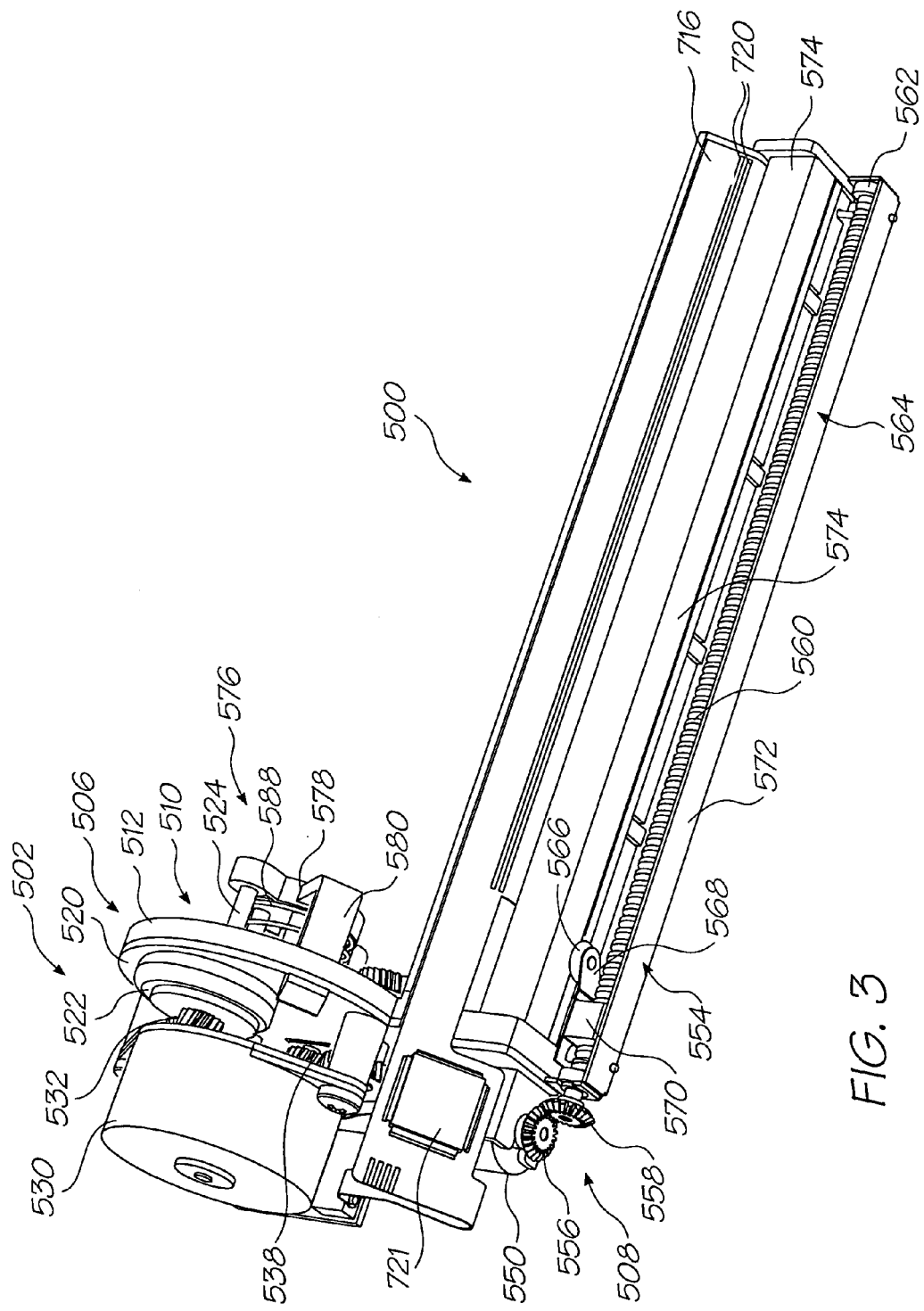
FIG. 3 shows a three dimensional view of the print engine with a removable print cartridge used with the print engine removed.
Figure 4:
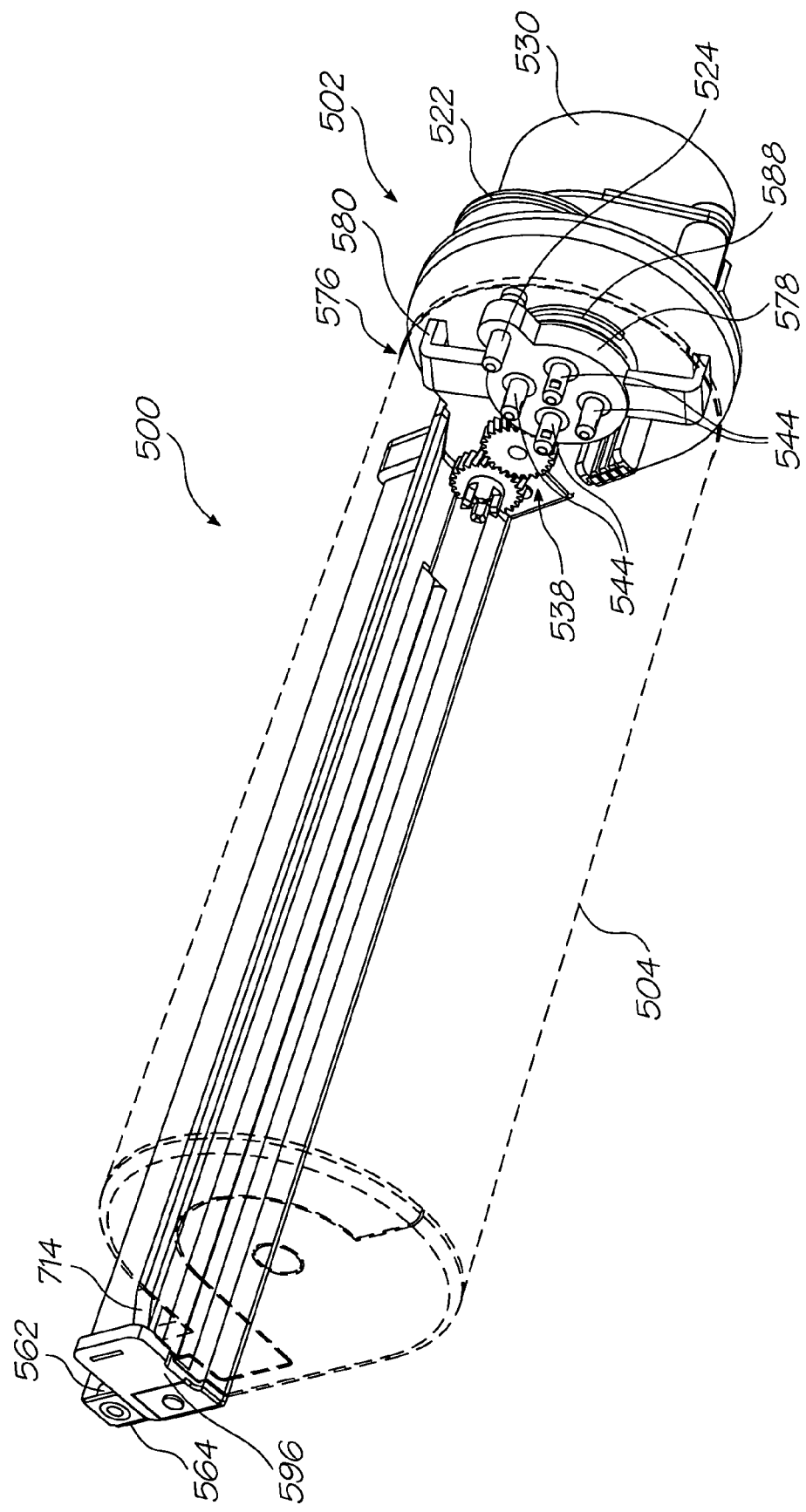
FIG. 4 shows a three dimensional, rear view of the print engine with the print cartridge shown in dotted lines.
Figure 5:
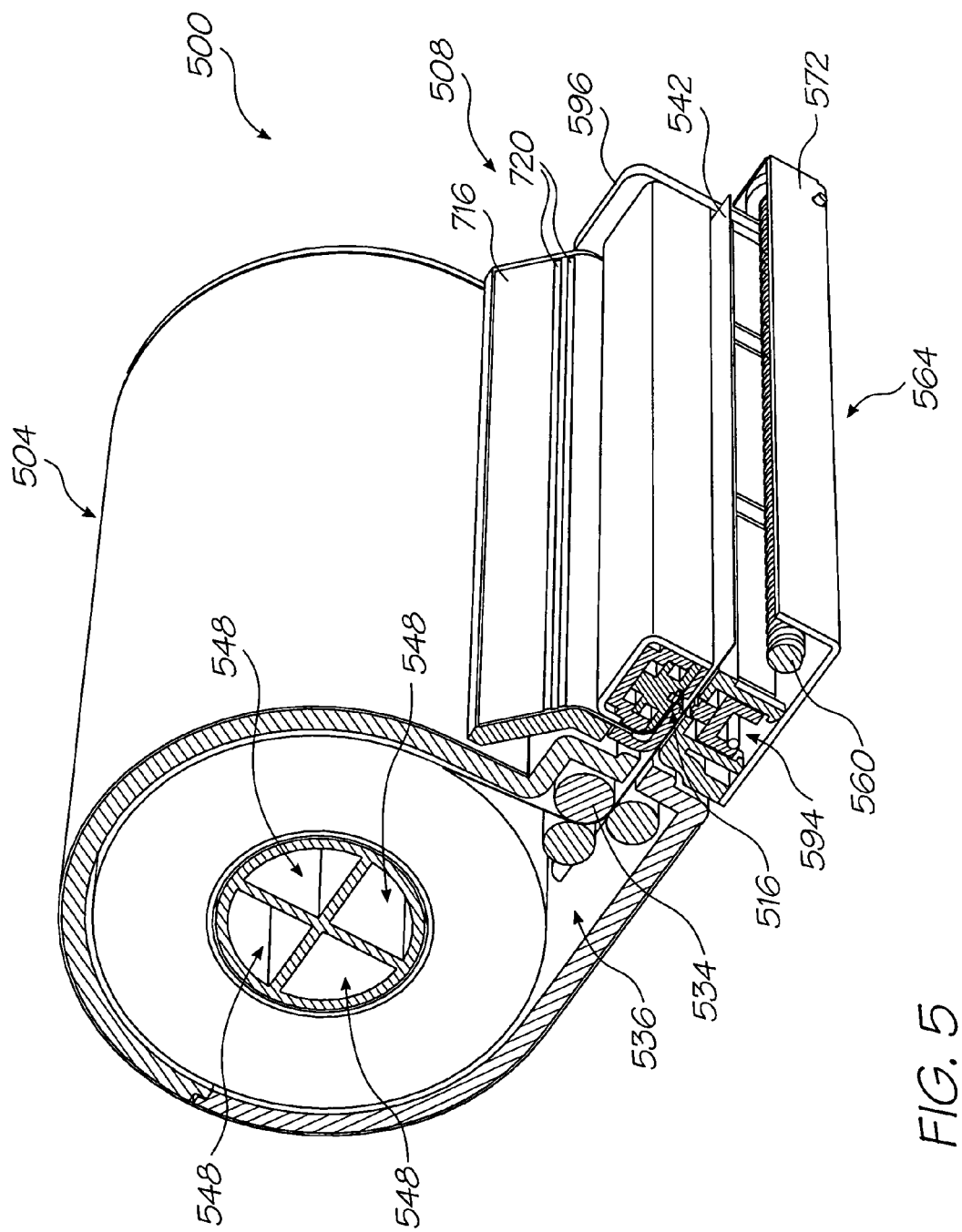
FIG. 5 shows a three dimensional, sectional view of the print engine.
Figure 6:
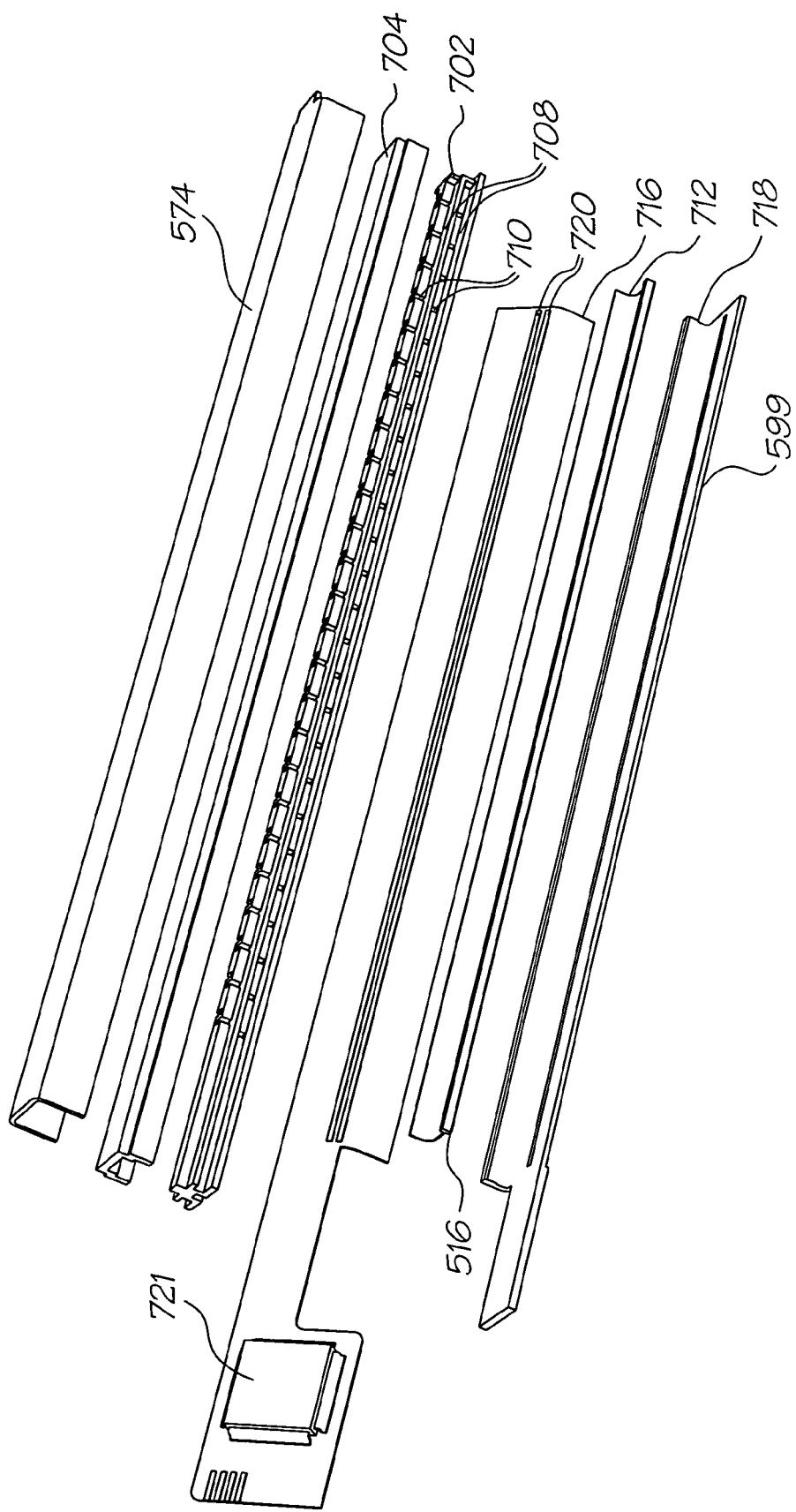
FIG. 6 shows a three dimensional, exploded view of a printhead sub-assembly of the print engine.

A coil spring 588 is arranged between the chassis 510 and the collar 578 to urge the collar 578 to a spaced position relative to the chassis 510 when the cartridge 504 is removed from the print engine 500, as shown in greater detail in FIG. 3 of the drawings. The ejector mechanism 576 is shown in its retracted position in FIG. 4 of the drawings.

The printhead sub-assembly 508 includes, as described above, the base plate 564. A capping mechanism 590 is supported displaceably on the base plate 564 to be displaceable towards and away from the printhead 516. The capping mechanism 590 includes an elongate rib 592 arranged on a carrier 593. The carrier is supported by a displacement mechanism 594, which displaces the rib 592 into abutment with the printhead 516 when the printhead 516 is inoperative. Conversely, when the printhead 516 is operational, the displacement mechanism 594 is operable to retract the rib 592 out of abutment with the printhead 516.

The printhead sub-assembly 508 includes a printhead support molding 596 on which the printhead 516 is mounted. The molding 596, together with an insert 599 arranged in the molding 596, defines a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 7) to the printhead 516.

An air supply channel 711 (FIG. 8) is defined in the spine portion 704, alongside the printhead 516.

Electrical signals are provided to the printhead 516 via a TAB film 712 which is held captive between the insert 599 and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 516 and to the other powered components of the print engine 500. Further, a camera print engine control chip 721 is supported on the flex PCB 716 together with a QA chip (not shown) which authenticates that the cartridge 504 is compatible and compliant with the print engine 500. For this purpose, the PCB 716 includes contacts 723, which engage contacts 725 in the print cartridge 504.

Figure 7:
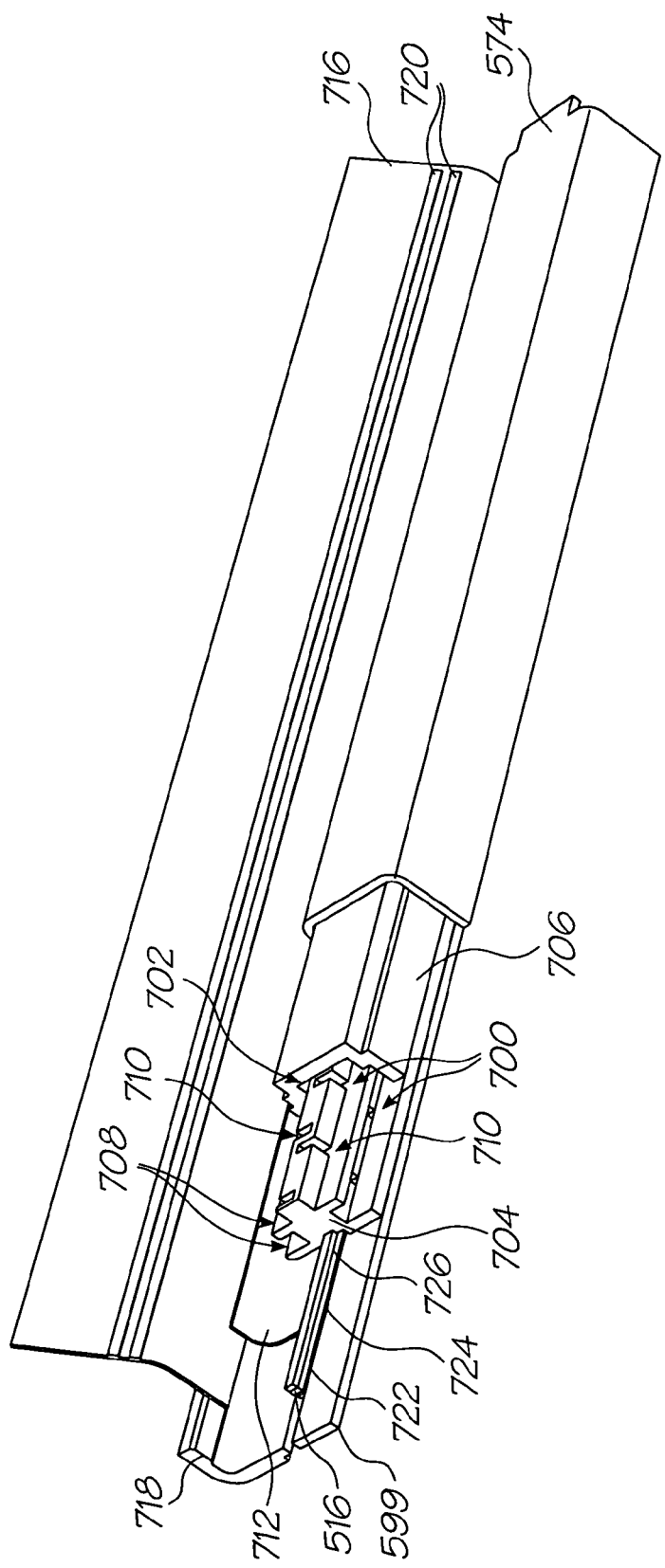
FIG. 7 shows a partly cutaway view of the printhead sub-assembly.
Figure 8:
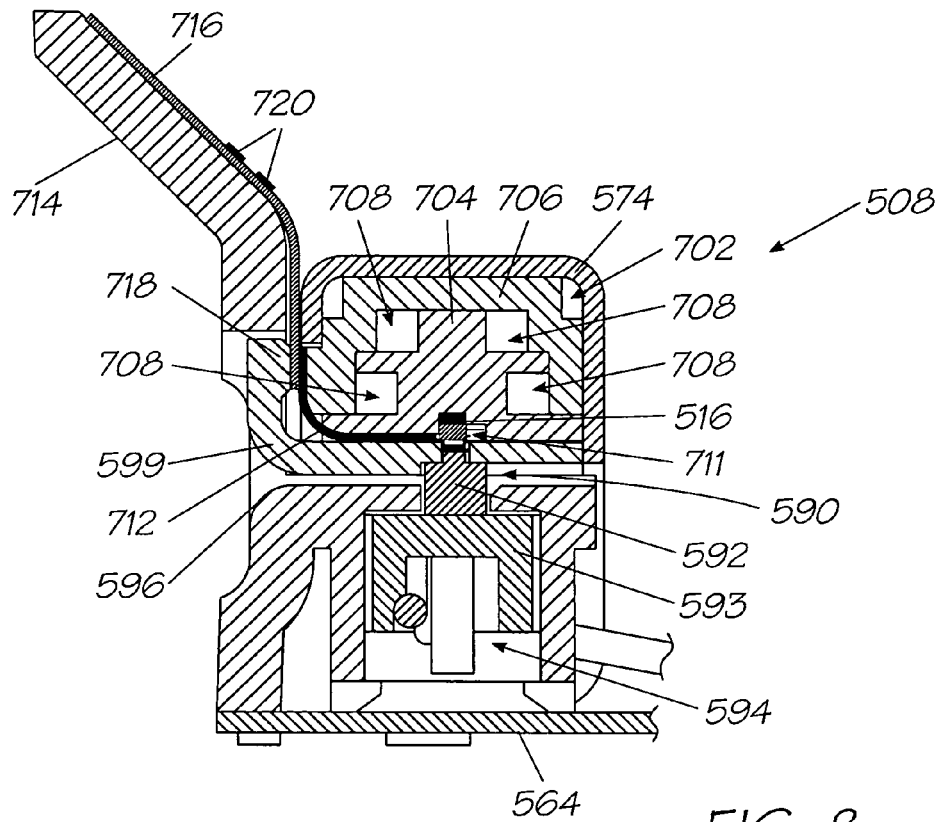
FIG. 8 shows a sectional end view of the printhead sub-assembly with a capping mechanism in a capping position.
Figure 9:
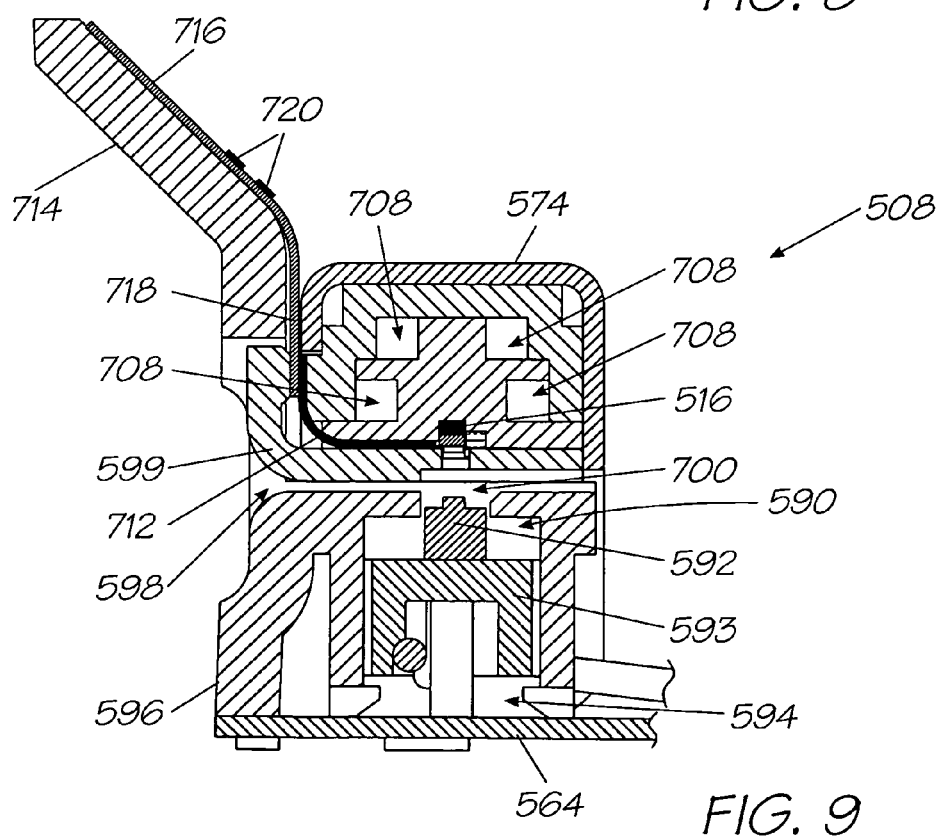
FIG. 9 shows the printhead sub-assembly with the capping mechanism in its uncapped position.

As illustrated more clearly in FIG. 7 of the drawings, the printhead itself includes a nozzle guard 722 arranged on a silicon wafer 724. The ink is supplied to a nozzle array (not shown) of the printhead 516 via an ink supply member 726. The ink supply member 726 communicates with outlets of the passages 710 of the ink feed arrangement 702 for feeding ink to the array of nozzles of the printhead 516, on demand.

Figure 10:
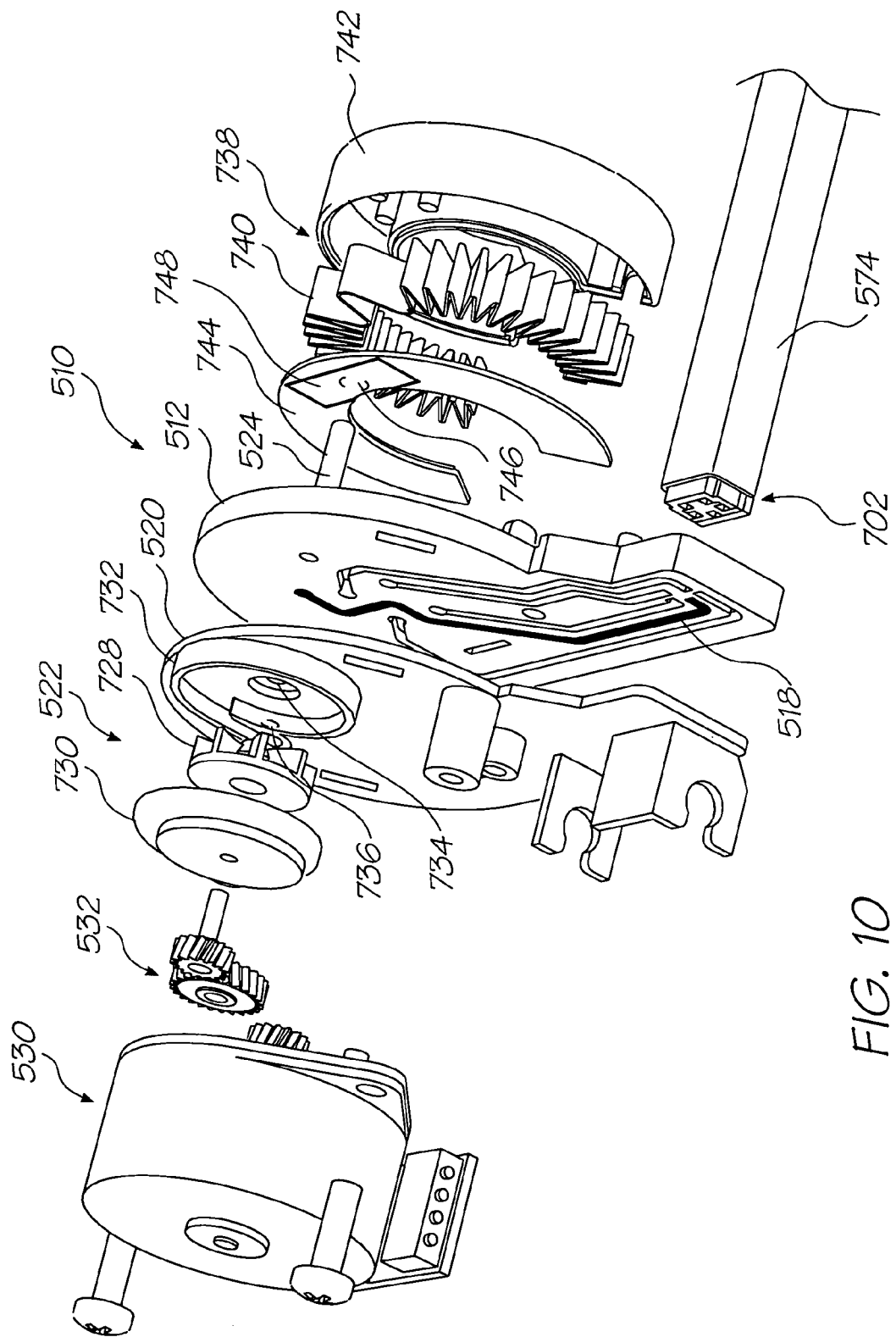
FIG. 10 shows an exploded, three dimensional view of an air supply arrangement of the print engine.

In FIG. 10, the air supply path for supplying air to the printhead 516 is shown in greater detail. As illustrated, the pump 522 includes an impeller 728 closed off by an end cap 730. The cover molding 520 of the chassis forms a receptacle 732 for the impeller 728. The cover molding 520 has the air inlet opening 734 and the air outlet opening 736. The air inlet opening 734 communicates with the pin 524. The air outlet opening 736 feeds air to the air supply channel 518 which, in FIG. 10, is shown as a solid black line. The air fed from the air supply channel 518 is blown into the printhead 516 to effect cleaning of the printhead. The air drawn in via the pump 522 is filtered by an air filter 738, which is accommodated in the print cartridge 504. The air filter 738 has a filter element 740 which may be paper based or made of some other suitable filtering media. The filter element 740 is housed in a canister, having a base 742 and a lid 744. The lid 744 has an opening 746 defined therein. The opening 746 is closed off by a film 748 which is pierced by the pin 524. The advantage of having the air filter 738 in the print cartridge 504 is that the air filter 738 is replaced when the print cartridge 504 is replaced.

It is an advantage of the invention that an air pump 522 is driven by the stepper motor 530, which also controls feed of the print media to the printhead 516. In so doing, fewer components are required for the print engine 500 rendering it more compact. In addition, as the same motor 530 is used for operating the air pump 522 and for feeding the print media 542 to the printhead 516, fewer power consuming components are included in the print engine 500 rendering it more compact and cheaper to produce.

It is also to be noted that, in order to make the print engine 500 more compact, the size of the print engine assembly 502 is such that most of the components of the assembly 502 are received within a footprint of an end of the print cartridge 504.

Figure 11:
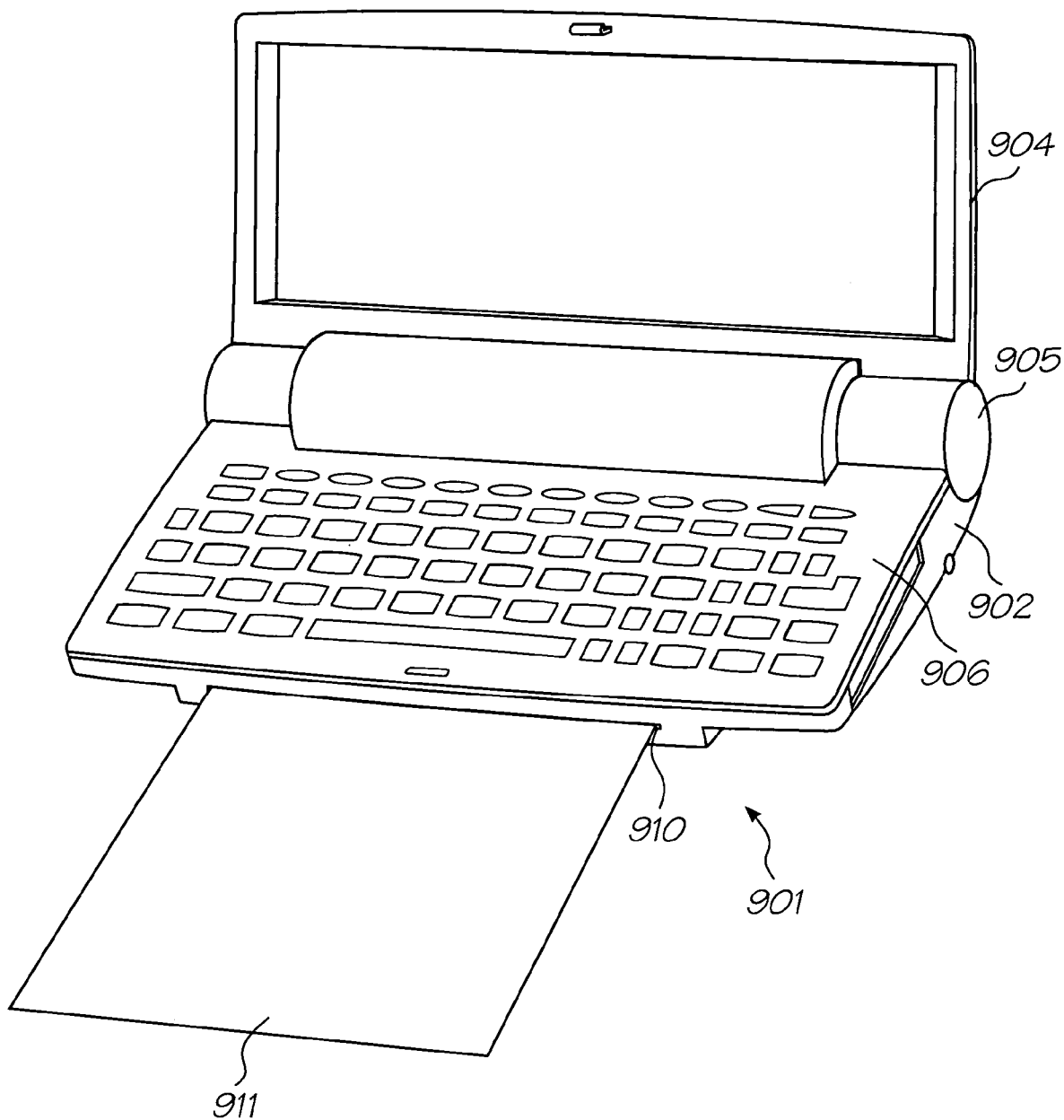
FIG. 11 shows a personal digital assistant having a built in printer.

In FIG. 11 there is depicted a personal digital assistant having an internal printer. The digital assistant 901 includes a body section 902 housing the main circuitry of the digital assistant including a digital storage medium. A display screen 904 is pivotably connected to the body section 902 about a hinge joint 905. The screen 904 pivots between a closed position (FIG. 12) where the screen lies adjacent the body section 902 thus allowing safe transport, and an open position (FIG. 11) where the screen 904 is visible to a user.

The body section 902 includes a control panel 906 on an upper surface thereof that includes all buttons required to operate the functions of the digital assistant including the functions of the printer. Using this control panel, a user can selectively view any stored information and make any new entries or amendments. The control panel also includes keys allowing the user to selectively print any of the stored information. A slot 910 in the front edge of the body is used for ejecting printed media 911.

The display screen is of a known touch screen type allowing a user to control the digital assistant using a compatible pixel pen (not shown) through which the user selects items on a displayed menu. In addition the digital assistant may include known pattern recognition software that allows a user to enter information by writing on the screen whereafter the user's input is analysed and converted into text.

Figure 14:
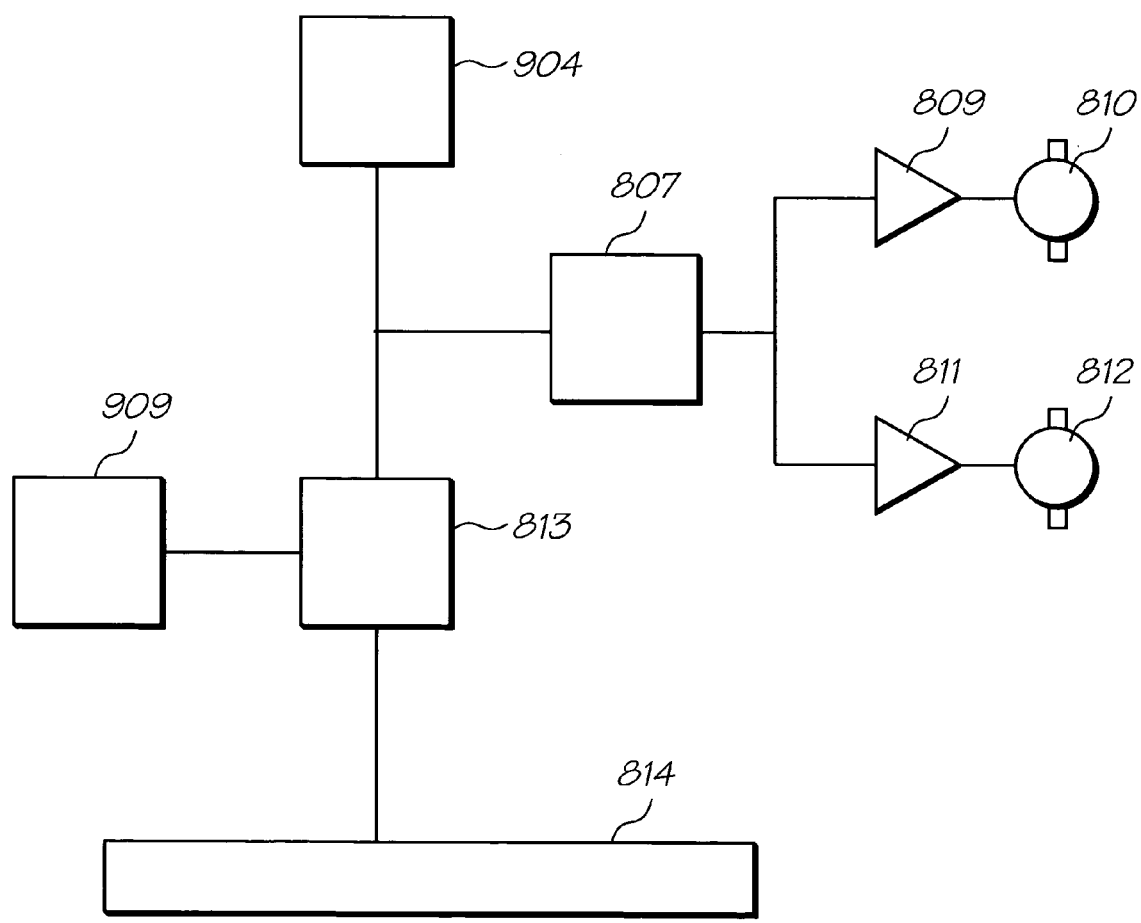
FIG. 14 is a schematic block diagram of components incorporated into a personal digital assistant having a built-in printer.

In FIG. 14 there is schematically depicted in block diagram form the key internal components of a personal digital assistant having an internal printer. The printer would typically utilize a monolithic printhead 814 which could be the same as described above with reference to FIGS. 1 to 10, but could alternatively be another compact printhead capable of printing on suitably sized print media. Print data from the memory 909 of the digital assistant or a display screen dump 904 is fed to a print engine controller 813 which controls the printhead 814.

A micro-controller 807 associated with the print engine controller controls a motor driver 809 which in turn drives a media transport device 810. This might be the same as stepper motor 530 described earlier.

The micro-controller 807 also controls a motor driver 811 which in turn controls a guillotine motor 812 to sever a printed sheet from an in-built roll of print media after an image is printed. A sheet being driven by media transport device 810 is shown at 911 in FIG. 11. The guillotine might be of the form of cutter wheel 566 described earlier.

When ready, printer control buttons on the control panel can be depressed to activate the print engine controller to print stored information either from memory or as a screen dump from the display screen. This would in turn activate the micro-controller 807 to activate the media transport 810 and guillotine 812.

Figure 12:
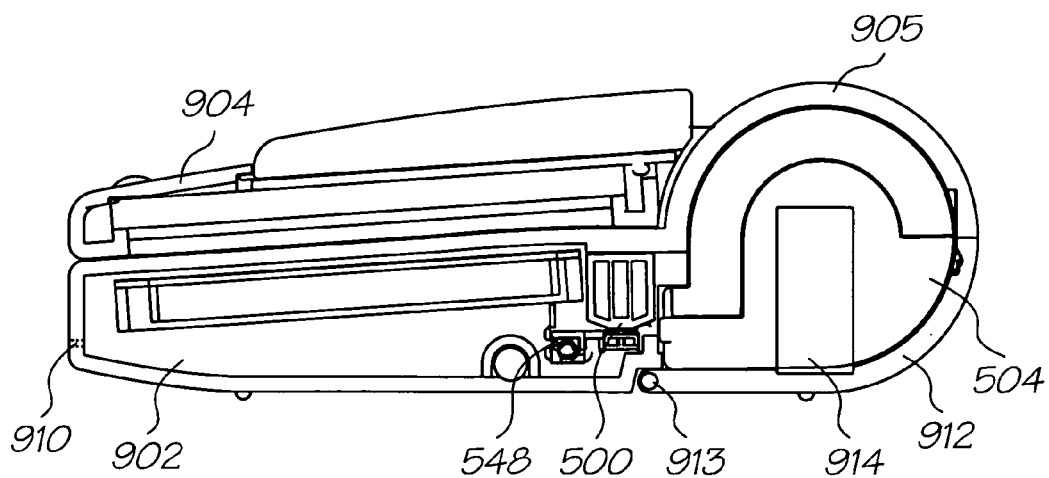
FIG. 12 shows the internal components of a personal digital assistant having a built in printer.
Figure 13:
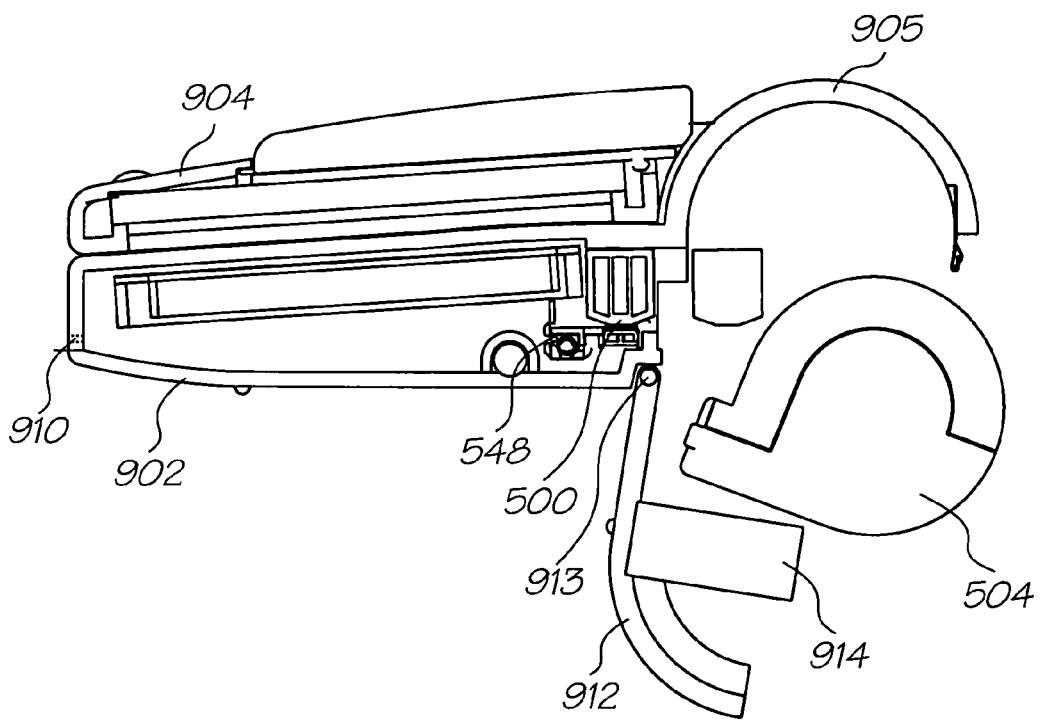
FIG. 13 shows a personal digital assistant with a releasable cover portion.

FIG. 12 shows an internal view of the personal digital assistant in its closed position. The printer engine 500 described previously is disposed within the body section 902 with the removable print media cartridge 504 being disposed in the hinge joint 905 linking the body section 902 with the display screen 904. Printed media ejected from the print media passage 548 of the print engine travels substantially along the inner surface of the bottom panel of the body section 902 and exits the digital assistant at ejector slot 910. Because the print roll 504 is disposed within the hinge joint 905, the personal digital assistant of the present invention can be made substantially the same size as prior art digital assistants The body section 902 and hinge 905 include a releasable portion 912 pivotably connected through a hinge 913 and secured in a closed position by a catch 914. Opening of this portion (FIG. 13) allows the ink containing print roll cartridge 504 to be removed and replaced. Further details of a removable print roll cartridge are described in our co-pending application U.S. Ser. No. 09/607993 mentioned earlier.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

We claim:

1. A hand held personal digital assistant comprising:
an information storage device;
a display;
a printer including a pagewidth printhead wherein said printhead is an inkjet printhead;
a capping mechanism for capping the printhead when not in use;

a user interface allowing a user to: selectively retrieve and display information from said storage device on said display; print said information using said printer; and enter and store new information in said information storage device;

a body section connected to said display through a hinge joint, said body section housing said information storage device and at least a portion of said user interface, wherein at least a portion of said printer is disposed in said hinge joint, and a supply of print media disposed in said hinge joint.

2. The personal digital assistant of claim 1 wherein said printer comprises a supply of print media disposed within said personal digital assistant.

3. The personal digital assistant of claim 1 including a releasable cover portion through which a portion of said printer including said print media and/or an ink cartridge can be removed.

4. The personal digital assistant of claim 1 wherein said printer includes a monolithic pagewidth printhead.

5. The personal digital assistant of claim 4 wherein said printhead is an ink jet printhead.

6. The personal digital assistant of claim 1 wherein said user interface includes a touch screen integrated into the display.

\* \* \* \* \*